Sept. 23, 1941.          A. H. ADCOX                2,256,934
                      BRAKE CONTROL DEVICE
                    Filed Aug. 15, 1939         3 Sheets-Sheet 1
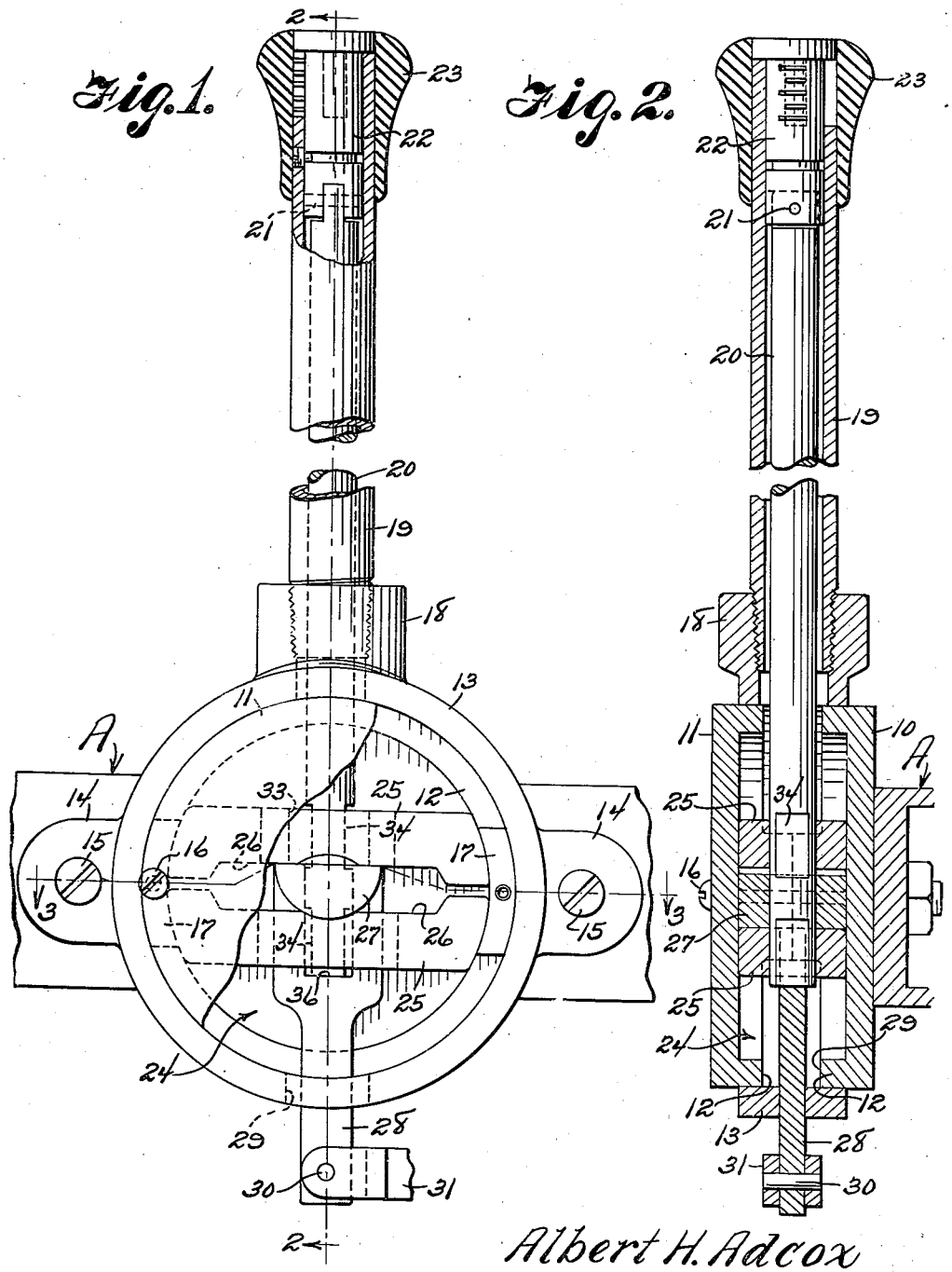
Albert H. Adcox
INVENTOR
BY Victor J. Evans & Co.
ATTORNEYS Sept. 23, 1941.     A. H. ADCOX     2,256,934
BRAKE CONTROL DEVICE
Filed Aug. 15, 1939     3 Sheets-Sheet 2
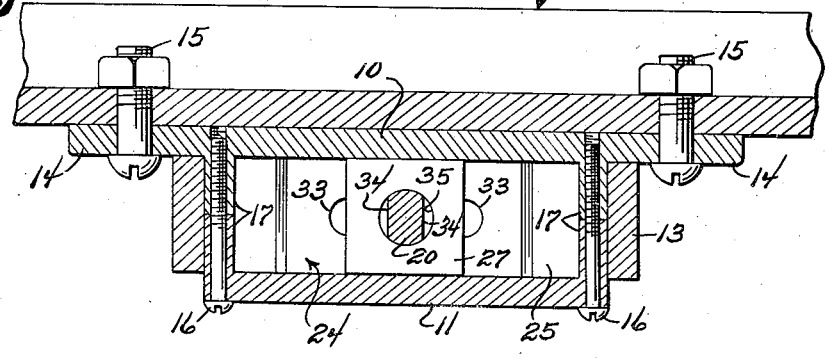
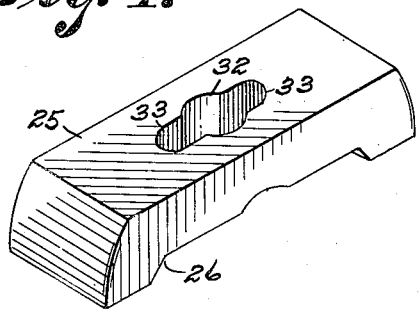
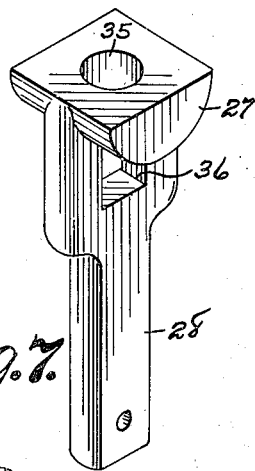
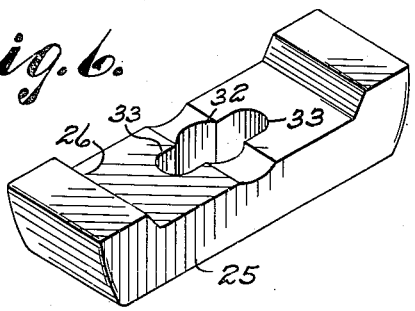
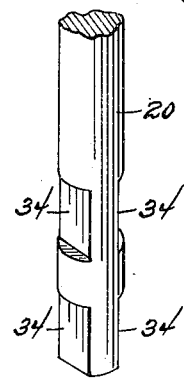
Albert H. Adcox INVENTOR
BY Victor J. Evans & Co.
ATTORNEYS

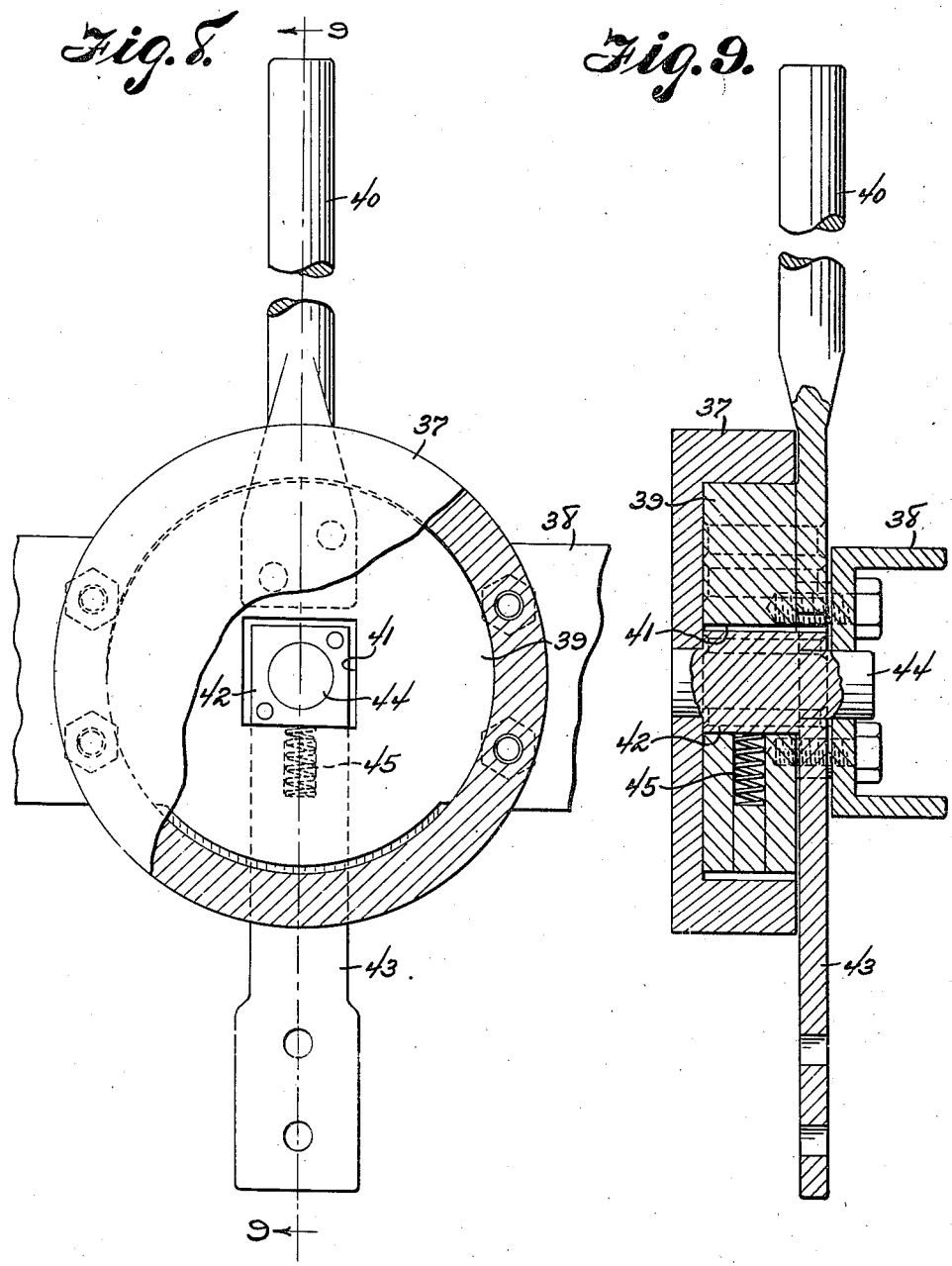

Patented Sept. 23, 1941

2,256,934

UNITED STATES PATENT OFFICE 2,256,934

BRAKE CONTROL DEVICE

Albert H. Adcox, Washington Park, Ill.

Application August 15, 1939, Serial No. 290,239

2 Claims. (Cl. 74—531)

The invention relates to brake operating mechanism and more especially to a brake control device.

The primary object of the invention is the provision of a device of this character wherein the brakes of a motor vehicle or those used on farming machinery, locomotives, power units or other machinery can be applied and released without the necessity of the installation of a ratchet system as is commonly employed with brake mechanisms of the present day type and such brakes when applied will be held fast to eliminate slippage, the device being of novel construction and susceptible of easy operation both in the applying and releasing of the brakes.

Another object of the invention is the provision of a device of this character wherein the control elements thereof are enclosed and concealed from view, the device when operated for the application of the brakes can be locked to eliminate tampering therewith and thus rendering the machinery, vehicle or the like with which the said device is associated theft proof.

A further object of the invention is the provision of a device of this character which is simple in its construction, thoroughly reliable and efficient in operation, relieved from wear, eliminating slipping of the brakes when in applied position, strong, durable, easy of handling and inexpensive to manufacture and install.

With these and other objects in view, the invention consists in the features of construction, combination and arrangement of parts as will be hereinafter more fully described in detail, illustrated in the accompanying drawings, which disclose the preferred and modified forms of the embodiment of the invention and pointed out in the claims hereunto appended.

In the accompanying drawings:

Figure 1 is a side elevation partly in section of a device constructed in accordance with the invention.

Figure 2 is a sectional view taken on the line 2—2 of Figure 1 looking in the direction of the arrows.

Figure 3 is a sectional view on the line 3—3 of Figure 1 looking in the direction of the arrows.

Figure 4 is a perspective view of one of the friction clutch parts of the device.

Figure 5 is a perspective view of the brake pressure lever of the device.

Figure 6 is a perspective view of another of the friction clutch parts of the device.

Figure 7 is a fragmentary perspective view of the locking stem of the device for the parts shown in Figures 4 and 6.

Figure 8 is a view similar to Figure 1 showing a modification of the invention.

Figure 9 is a sectional view taken on the line 9—9 of Figure 8 looking in the direction of the arrows.

Similar reference characters indicate corresponding parts throughout the several views in the drawings.

Referring to the drawings in detail, particularly Figures 1 to 7 inclusive which illustrate the preferred embodiment of the invention, A designates a portion of a horizontal support or sill of a chassis frame for the mounting of the control device constituting the present invention and hereinafter fully described.

The control device in Figures 1 to 7 inclusive of the drawings involves inner and outer spaced circular shaped cheeks 10 and 11 respectively, made from metal and having inturned annular peripheral flanges 12 in meshed relationship to each other while concentrically about these cheeks 10 and 11 is a turning ring 13 snugly fitting the said cheeks. The inner cheek 10 is formed with diametrically opposed external attaching ears 14 for fasteners 15 which engage therein and also engage in the support or sill A so that the said cheek 10 is immovably fixed thereto. The outer cheek 11 has passed therethrough fasteners 16, these being engaged in anchoring shoulders 17 formed with the flange 12 of the cheek 10 so that in this manner both cheeks are separably fixed to each other.

Integrally formed with the ring 13 is a coupling lug or nipple 18 having fitted therein a tubular handle bar or operating lever 19 while within the bar or lever is a turning lock stem 20 being pivotally coupled at 21 to a releasing lock 22 key operated and releasable from the handle or lever 19, being accessible centrally of a hand knob 23 mounted or carried at the free end of the said handle or lever 19.

Arranged within the space 24 between the cheeks 10 and 11, this space being created by the spacing of said cheeks, is a pair of opposed friction clutching members or jaws 25, these being adapted for gripping engagement with the inner peripheral surfaces of the flanges 12 on the cheeks 10 and 11 for the control of brakes (not shown) in an applied position.

Located between the members or jaws 25 in recessed areas 26 thereof is a cam head 27 of a brake pressure lever 28, the latter being extended through a clearance 29 therefor in the ring 13 to protrude from between the cheeks 10 and 11 at a point diametrically opposite the lever or handle 19. This lever 28 at its outer extended end has pivotal connection at 30 with a throw rod, a portion thereof being indicated at 31 for the brake to be applied and released on the manual shifting of the handle or lever 19. The members or jaws 25 centrally thereof are provided with openings in register with each other and each includes an enlarged intermediate portion 32 of a contour and size corresponding to slightly more than the full cross sectional size of the stem 20. The restricted outer portions 33, merging with the portion 32 are of a diameter corresponding to flat faced reduced areas 34 in cross section of the stem 20. These areas 34 are aligned with the reduced portions 33 of the openings in the members or jaws 25 when the key in 19 is locked, turning 20 one-fourth turn. The jaws are not now susceptible of movements when pressure on 19 is applied, this being due to greater recess of the rod 20 in the jaws over the recess of the rod 20 in the cam 27 at 35. In this relationship of these members or jaws 25 they frictionally bind against the flanges 12 of the cheeks 10 and 11 exerting a wedging action thereagainst and thus firmly holding the ring 13 against rotation. This ring is not a locking member, it serving to hold the lever in line and keep dirt out of the device.

This displacement of the members or jaws 25 relative to each other is brought about through tension exerted on the lever 28 when applying the brakes on throw of the handle or lever 19. Thus when the brakes are applied with pressure exerted on the lever 28 the said brakes cannot slip from braking position.

The stem 20 when unlocked by manipulating the lock 22 freeing it from the handle or lever 19, will be turned to have the full cross sectional area of said stem register with the intermediate portions 32 of the openings in the members or jaws 25, the said stem being extended through these openings as will appear in Figures 1 and 2. The members or jaws 25 will be moved in true parallel relation to each other upon movement of the lever 19 by action of the rod 20 on the jaws and the tension on the lever 28 relieved therefrom so that the brakes can be conveniently released by the throwing of the handle or lever 19 in that the members or jaws 25 will be declutched from the flanges 12 of the cheeks 10 and 11 and the ring 13 readily turned or rotated by the said handle or lever 19 for the release of the brakes.

The cam 27 has a circular hole or opening 35 receiving the stem 20 when engaged in the openings in the members or jaws 25 and the said lever 28 is forked at 36 to allow the stem 20 to protrude through the hole or opening 35 in the cam 27, the said hole or opening 35 being of a size slightly greater than the full cross sectional size of the stem 20. When the full cross sectional areas of the stem 20 are alined with the portions 32 of the opening in the members or jaws 25 these can spread or become irregularly spaced from parallel relationship to each other resultant from the action of the cam 27 when pressure is upon the lever 28 and in this way the brakes will be held fast in applied condition.

In Figures 8 and 9 of the drawings there is shown a modification of the invention wherein a circular housing or casing 37 which is fixed to the support, a portion thereof being indicated at 38 loosely accommodates for rotation therein a turning disc 39 having fast thereto or integral therewith an operating handle or lever 40, the said disc 39 being provided with a squared slightly off center opening 41 loosely accommodating a squared block 42. The bottom side of the said block 42 is closely fitted to the bottom side of the slightly off-centered square opening 41, both sides and the top of the said block 42 being recessed, said block 42 having fixed thereto a pressure brake lever 43 which extends diametrically opposite the lever or handle 40. This block 42 is turnable on a stud journal 44 fixed centrally to the casing or housing 37. Said block 42 can be made of any desirable shape providing a flat side is present for contact with or placement in proximity to the bottom side of a slightly off-centered opening as heretofore referred to and indicated at 41. Counterseated in the disc 39 and acting against the block 42 at the lowermost side thereof is a coiled expansion spring 45 so that a tension action between the disc 39 and the block 42 exists. The said disc 39 is susceptible of eccentric displacement when pressure is exerted on the lever 43 and under this displacement the said disc 39 frictionally binds against the casing or housing 37 locking or holding the brakes in an applied position, the said brakes being connected with the said lever 43 similarly to the connection 31 with the lever 28.

When the lever or handle 40 is shifted to bring the same in true longitudinal alignment with the lever 43 the disc 39 is declutched or released from its frictional engagement with the casing or housing 37 and thus the brakes can be readily released under the continued relationship of the said levers 40 and 43 and pressure exerted upon the said lever 43 having been relieved.

It is not required in the use of the brake control device hereinbefore set forth that ratchet latching mechanism be employed for the holding of the brakes in released or applied condition.

The lever or handle 19 and also the lever or handle 40 of the preferred and modified forms of the invention are manually shifted for the release and applying of the brakes.

What is claimed is:

1. A brake control device of the kind described comprising a braking lever, a manually operated throw lever movably connected to the braking lever, a friction clutch interposed between the levers and including movable frictional binding members both operated by the force of the braking lever for the holding and releasing of said levers in the setting and freeing of a brake, and means coacting with the throw lever and said members for the locking of the latter to prevent disengagement of the same.

2. A brake control device of the kind described comprising a braking lever, a throw lever, a friction clutch interposed between the levers and including movable frictional binding members both controlled by the force of the throw lever for the holding and releasing of said levers in the setting and freeing of a brake, a contact element fixedly held and engaged by said members of the friction clutch, and means coacting with the throw lever and said members for the locking of the latter to prevent disengagement of the same.

ALBERT H. ADCOX.